(12) United States Patent
Miyoshi

(10) Patent No.: US 7,263,084 B2
(45) Date of Patent: Aug. 28, 2007

(54) RADIO TRANSMITTING APPARATUS, RADIO RECEIVING APPARATUS AND RADIO TRANSMITTING METHOD

(75) Inventor: Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 798 days.

(21) Appl. No.: 10/473,877

(22) PCT Filed: Jan. 9, 2003

(86) PCT No.: PCT/JP03/00104

§ 371 (c)(1),
(2), (4) Date: Oct. 2, 2003

(87) PCT Pub. No.: WO03/061171

PCT Pub. Date: Jul. 24, 2003

(65) Prior Publication Data

US 2004/0114549 A1 Jun. 17, 2004

(30) Foreign Application Priority Data

Jan. 17, 2002 (JP) .............................. 2002-009230

(51) Int. Cl.
 *H04B 7/216* (2006.01)
(52) U.S. Cl. ...................................... 370/335; 370/342
(58) Field of Classification Search ................ 370/335, 370/342, 343, 344; 714/748, 749
See application file for complete search history.

(56) References Cited

U.S. PATENT DOCUMENTS

2002/0159502 A1   10/2002   Uesugi

FOREIGN PATENT DOCUMENTS

| EP | 1003296 | 5/2000 |
|---|---|---|
| GB | 2337431 | 11/1999 |
| JP | 08119106 | 5/1996 |
| JP | 10233758 | 9/1998 |
| JP | 11205279 | 7/1999 |
| JP | 11275054 | 10/1999 |
| JP | 2000151504 | 5/2000 |
| JP | 2000269929 | 9/2000 |
| JP | 2001060934 | 3/2001 |
| JP | 2001268049 | 9/2001 |
| JP | 2001268050 | 9/2001 |

OTHER PUBLICATIONS

PCT International Search Report dated Apr. 15, 2003.

*Primary Examiner*—Lee Nguyen
(74) *Attorney, Agent, or Firm*—Stevens, Davis, Miller & Mosher, LLP

(57) ABSTRACT

A spread code to be allocated to transmission data is changed at a previous transmitting time and a next transmission time. For example, at transmission of the first packet (first transmission), symbols "1" to "4" are spread by spread code #0, while at transmission of the second packet (retransmission), symbols "1" to "4 " are spread by spread code #1. As a result, since despread signals of the respective symbols obtained by a plurality of reception times on a receiver side are synthesized, it is possible to eliminate a reception symbol having an extremely small reception level, so that reception quality can be improved.

5 Claims, 14 Drawing Sheets

TABLE

| THE NUMBER OF TRANSMISSION | SPREAD CODE | | | |
|---|---|---|---|---|
| 1 | #0 | #1 | #2 | #3 |
| 2 | #1 | #2 | #3 | #0 |

FIG.12

TABLE

| THE NUMBER OF TRANSMISSION | SPREAD CODE | | | |
|---|---|---|---|---|
| 1 | #0 | #1 | #2 | #3 |
| 2 | #2 | #3 | #4 | #5 |

FIG.13

RADIO TRANSMITTING APPARATUS, RADIO RECEIVING APPARATUS AND RADIO TRANSMITTING METHOD

TECHNICAL FIELD

The present invention relates to a radio transmitting apparatus, radio receiving apparatus and radio transmitting method, and particularly to those that are suitably applicable to a case in which retransmission processing is adaptively performed according to a bit error rate of a received signal or the like.

BACKGROUND ART

Conventionally, in a radio communication system, when a bit error rate of a receiving apparatus does not satisfy a predetermined value, there is generally performed an ARQ (Automatic Repeat reQuest) in which the receiving apparatus transmits a retransmission request signal to a transmitting apparatus and the transmitting apparatus transmits the same transmission data again according to this request.

Particularly, a packet transmission, which transmits data traffic, needs error control using ARQ since data transmission with no error must be ensured. In addition, the use of a hybrid ARQ (hereinafter referred to as HARQ) having an FEC (Forward Error Correction) function incorporated is standardized under 3GPP since occurrence of a packet error caused by a measurement error, control delay and the like is unavoidable even at the time of applying adaptive modulation and error correction where an optimal modulation system and a coding system are selected according to the state of a propagation path to improve throughput.

By the way, when the ARQ technique or HARQ technique is used in radio communication system of CDMA (Code Division Multiple Access) or OFDM-CDMA where CDMA and OFDM (Orthogonal Frequency Division Multiplexing) are combined, this is useful when propagation environments change at high speed, but provides a defect in which a large effect cannot be obtained when propagation environments change at low speed (in other words, a case in which the time variation of propagation environments is small).

In the CDMA, interference between spread codes occurs when there is a delay wave. The influence of interference between the spread codes differs for each spread code. In other words, there are a spread code where reception quality is largely degraded by interference and a spread code where reception quality is not degraded so much by interference.

For this reason, when the time variation of the propagation environments is small, transmission data transmitted using the spread code where reception quality is largely degraded still has poor reception quality on a receiving side even if retransmission is performed. Namely, regarding the symbol whose quality of line is poor at a first receiving time, the quality of line stays poor at second and the afterward receiving time for retransmission, and sufficient performance cannot be obtained even if the resultants are combined. As a result, there is a fear that only the reduction in transmission efficiency due to retransmission will be outstanding in addition to the point that improvement of the error rate of the received signal that should be originally obtained will not be obtained.

DISCLOSURE OF INVENTION

An object of the present invention is to provide a radio transmitting apparatus, which can improve an error rate on a receiving side when the same transmission data is retransmitted from a transmitting side, radio receiving apparatus and radio transmitting method in a radio communication using CDMA.

This object can be attained by despread transmission data using a spread code different from one used when transmission data is retransmitted in a radio communication system using CDMA.

BRIEF DESCRIPTION OF DRAWINGS

FIG. 12 is a view illustrating one example of the contents of a mapping table;

FIG. 13 is a block diagram illustrating one example of the contents of a mapping table;

BEST MODE FOR CARRYING OUT THE INVENTION

Figure 1:
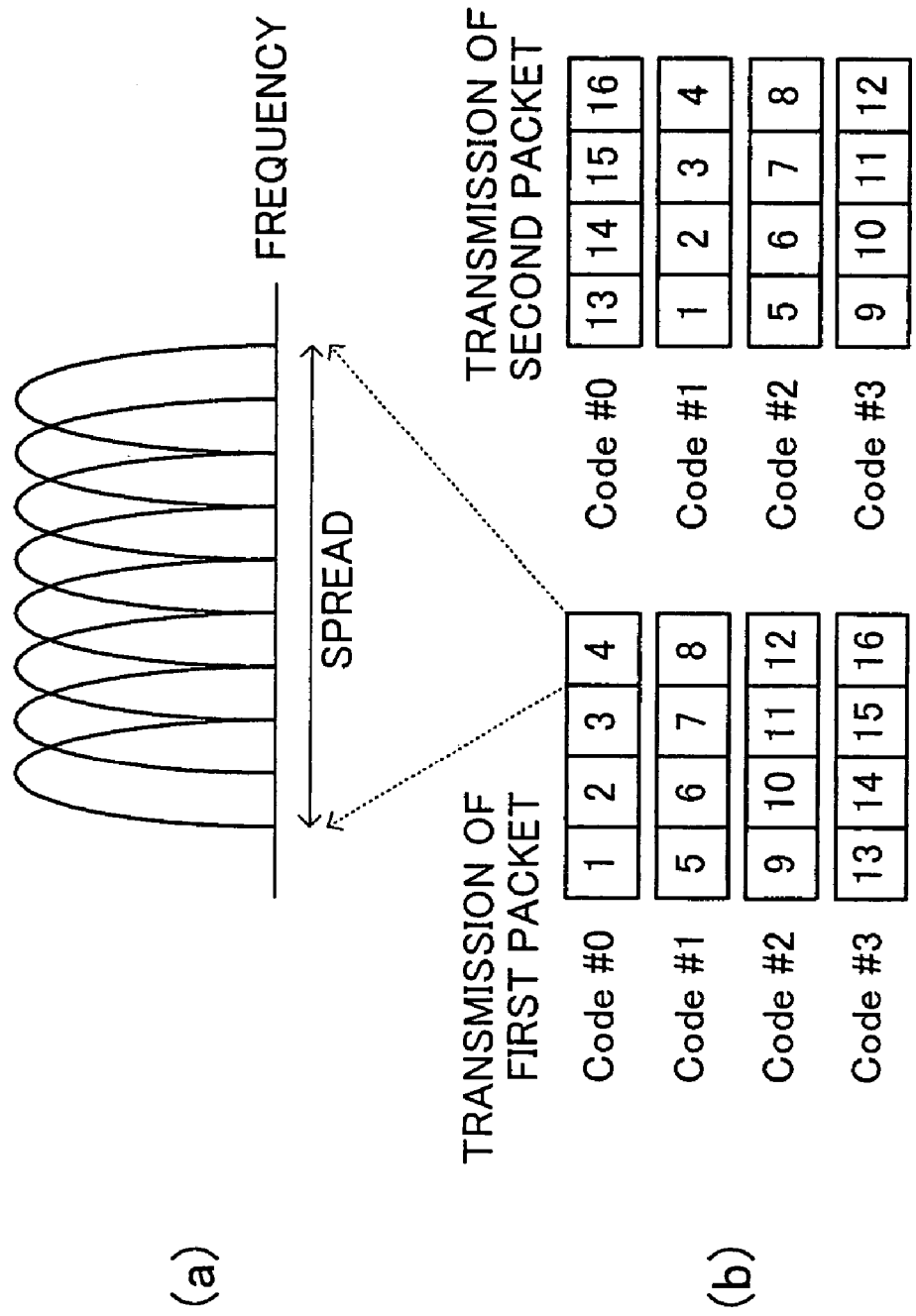
FIG. 1 is a view illustrating an example of a spread code allocation to each symbol at the time of transmitting an OFDM-CDMA signal to explain the principle of the present invention.

The following will specifically explain the embodiment of present invention with reference to the drawings.

(1) Principle of Embodiment

First of all, the principle configuration of the present embodiment will be explained. In the CDMA system, interference between spread codes occurs when there is a delay wave. The influence of interference between the spread codes differs for each spread code. In other words, there are a spread code where reception is largely degraded by interference and a spread code where reception quality is not degraded so much by interference. The present inventors arrived at the present invention upon discovering that quality of each bit (symbol) subjected to spreading by each spread code for each retransmission had been changed by changing the spread code assigned for each retransmission, thereby increasing the effect of the combination of ARQ and HARQ to improve reception quality.

In other words, even when the transmitted signal passes through the same fading circuit, the quality of the received signal differs depending on the spread code to be used. For this reason, if the same symbol is spread by the spread code, which is different for each transmission, the receiving side combines the retransmitted symbol with the symbol previously transmitted to receive, thereby making it possible to obtain diversity effect.

The present invention can be also used to a case of transmission to one counterpart station using a plurality of spread codes (this is a so-called multi-code multiplex transmitting time). The following two methods can be proposed as an implement method in this case.

The first method is one in which the number of spread codes to be used in transmission is preset to be the same as that of signal multiplexes and allocation of spread codes to be used among the spread codes is changed. This method will be explained in item (1-1) set forth below. The second method is one in which the number of spread codes, which is larger than that of signal multiplexes, is prepared and the kind of spread code to be used for transmission among the spread codes is changed. This method will be explained in item (1-2) set forth below.

Moreover, the following will explain a case in which the present invention is applied to OFDM-CDMA system where the effect of the present invention is brought to the fore.

Here, before explaining a specific example of the present invention, a brief explanation will be first given of OFDM-CDMA system. The OFDM-CDMA system is a communication system that can transmit transmission data with high quality to numerous communication terminals by using an advantage obtainable from an OFDM modulation system where a transmission symbol length can be lengthened and an advantage obtainable from a CDMA modulation system where high strength against interference resistance is provided.

The OFDM-CDMA system can be largely classified into a time area spread system and a frequency area spread system. The time area spread system is one that the respective spread data spread on a chip basis by the spread code is arranged in the same subcarrier in a time direction. While, the frequency area spread system is one that the respective spread data spread on a chip basis is assigned to the different subcarrier.

The following embodiment will explain a case in which the frequency area spread is performed in connection with the OFDM-CDMA system. Additionally, this embodiment will explain a case in which a so-called multi-code multiplex is performed where the respective symbols are spread using the spread codes orthogonal to each other in order to multiplex a plurality of symbols to transmit in the same subcarrier. By performing multi-code multiplex transmission in this way, a large capacity of transmission data can be transmitted at high speed.

(1-1) Case in which the number of spread codes that is the same as that of signal multiplexes is used FIG. 1 shows the principle when the present invention is applied to the OFDM-CDMA radio communication system. FIG. 1(a) illustrates a view schematically showing an OFDM signal that superimposes a spread signal thereon. FIG. 1(b) illustrates a spread code allocation to each symbol at a first transmitting time and a spread code allocation to each symbol at a second transmitting time (retransmission). In this connection, codes #1 to #3 in FIG. 1(b) indicate spread codes and orthogonal codes that are orthogonal to each other are used.

Moreover, numerals "1" to "16" in FIG. 1(b) indicate transmission symbols to be spread, and they are spread using predetermined spread codes #1 to #3, respectively. More specifically, at the first packet transmission (first transmission), symbols "1" to "4" are spread using spread code #0, symbols "5" to "8" are spread using spread code #1, symbols "9" to "12" are spread using spread code #2, and symbols "13" to "16" are spread using spread code #3.

On the other hand, at the second packet transmission (retransmission), symbols "1" to "4" are spread using spread code #1, symbols "5" to "8" are spread using spread code #2, symbols "9" to "12" are spread using spread code #3, and symbols "13" to "16" are spread using spread code #0.

In this way, at the time when transmission data is retransmitted, the combination of spread codes to be used to spread transmission data of each sequence are changed the combination at the previous time to perform spread processing, with the result that when signals are synthesized after despreading the respective symbols obtained by a plurality of reception times on the receiving apparatus side, reception power of the respective symbols is equalized. Resultantly, this makes it possible to eliminate a reception symbol with an extremely small reception level that is caused by the kind of spread code and to improve reception quality.

In connection with symbols "1" to "4" in FIG. 1(b) they are respectively spread using spread code #0 and superimposed on subcarriers each having a different chip. For example, in a case where spread code #0 is an 8-times spread code, 8 chips can be obtained for each symbol, so that the chips are frequency area spread to 32 subcarriers after symbols "1" to "4" are spread. The same is applied to symbols "5" to "8", "9" to "12", and "13" to "16."

Here, in the OFDM-CDMA frequency area spread system, the signal is spread in a frequency axial direction to perform transmission. In a state that frequency selective fading exists, a signal level largely varies between the subcarriers. At this time, interference between the spread codes becomes large, and power of spread symbols differs largely depending on the used spread codes and superimposed subcarriers. Symbols "1", "5", "9", and "13" are spread by spread codes #0, #1, #2, and #3 respectively to transmit, but reception power of each symbol differs largely by inference between the spread codes. Moreover, symbols "1", "2", "3", and "4" are spread by the same spread code #0, but reception power of each symbol differs depending on superimposed subcarriers.

Figure 2:
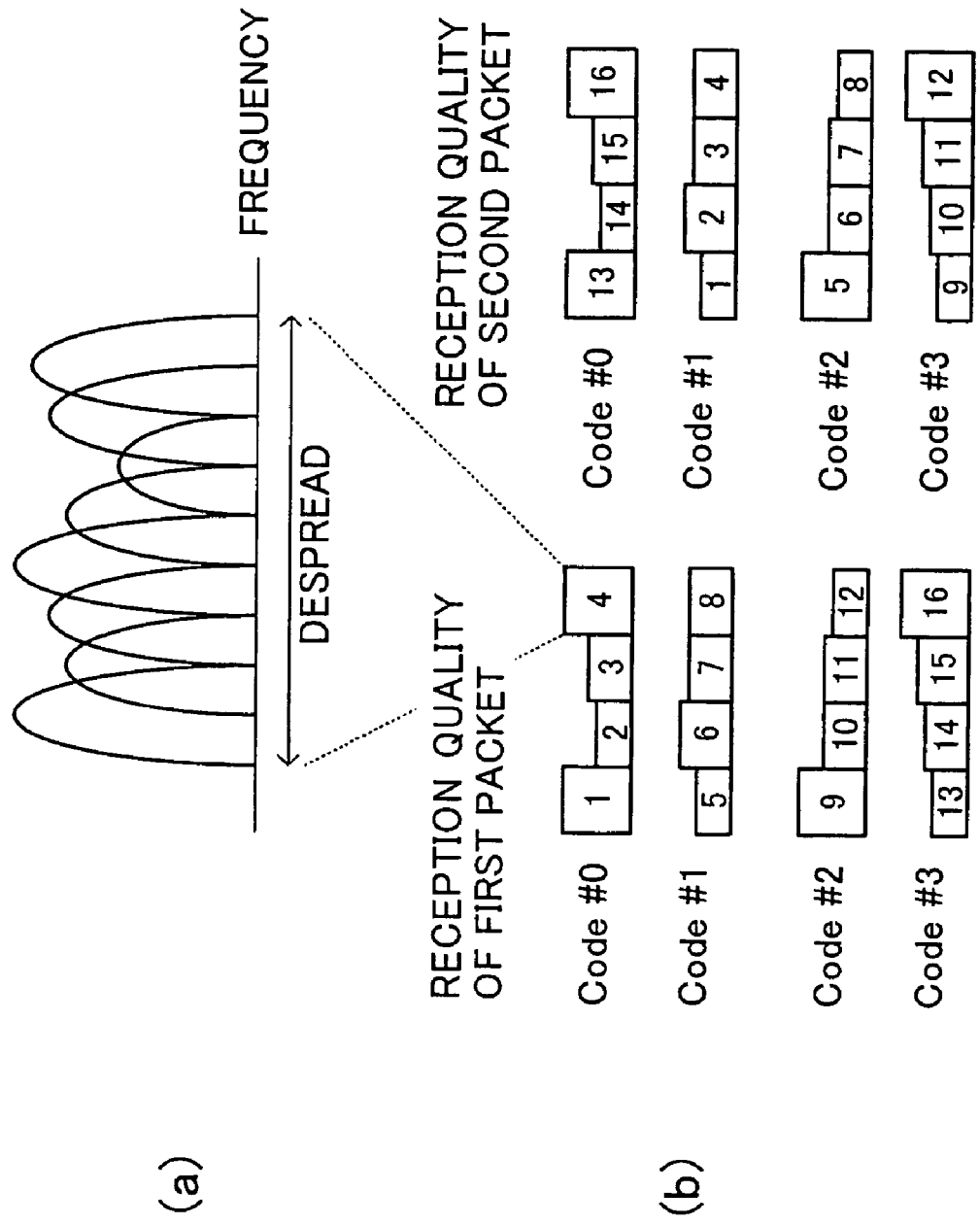
FIG. 2 is a view explaining reception quality (reception level) of each symbol at the time of receiving the OFDM-CDMA signal of FIG. 1.

This state is illustrated in FIG. 2. FIG. 2(a) shows a state of the OFDM signal at the receiving time, and the level of a certain subcarrier drops due to the frequency selective fading. By this influence, the level of the chip superimposed on the subcarrier whose level has dropped also drops. As a result, orthogonality between the spread codes breaks.

Here, in order to simplify the explanation, attention is paid to the symbols superimposed on the same subcarrier. As illustrated in FIG. 2(b), among symbols "1", "5", "9", and "13", symbols "1" and "9" spread using spread codes #0 and #2 have good reception quality since breakage of orthogonality between spread codes #0 and #2 is small. While, symbols "5" and "13" spread using spread codes #1 and #3 have poor reception quality since breakage of orthogonality between spread codes #1 and #3 is large.

However, according to the present invention, at the second transmission (second packet), the spread codes, which are different from those used at the first transmission time, are allocated to the respective symbol to perform spread processing, so that a reduction in reception quality is restrained. In other words, as shown in the reception quality of the second packet in FIG. 2(b), the reception quality of symbol "5" and "13", which has been poor at the first transmission, is improved by spread codes #0 and #2 allocated at the retransmission time. As a result, the reception quality of each symbol after combining becomes uniform (equalized) by diversity effect, and the reception quality can be improved as a whole.

Figure 3:
FIG. 3 is a view illustrating reception quality (reception level) of each symbol when the same symbols of the first and second packets of FIG. 2 are combined.

The diversity effect will be specifically explained. Since the combination of spread codes to be used is made different at the first transmission and second transmission as illustrated in FIG. 2(b), the reception power of the symbol, which has been low at the first transmission, is improved at the second transmission. As a result, as illustrated in FIG. 3, power of signals synthesized after the second packet is received is equally improved in connection with all symbols, so that stabilized reception can be carried out.

Figure 4:
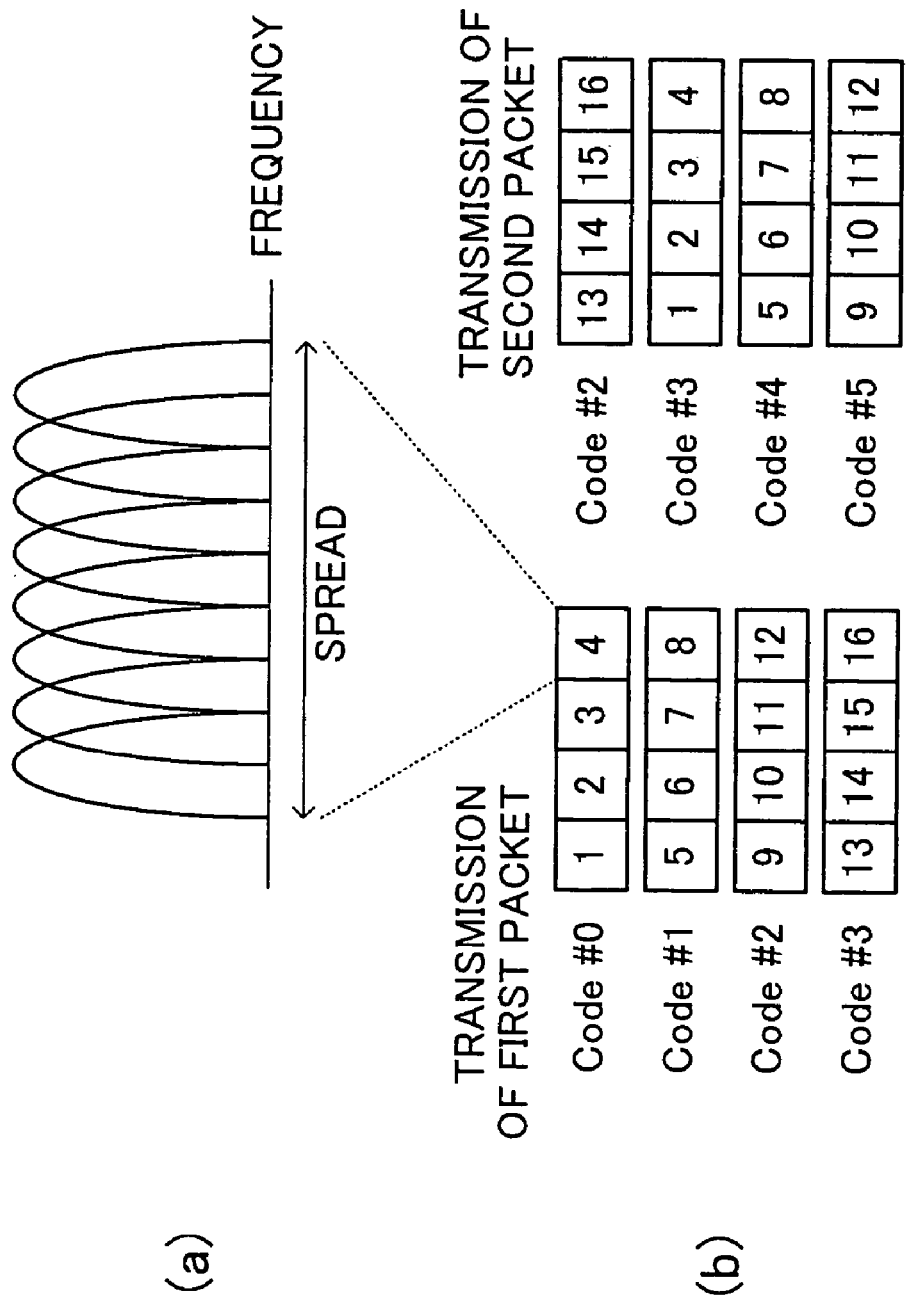
FIG. 4 is a view illustrating an example of a spread code allocation to each symbol at the time of transmitting an OFDM-CDMA signal to explain the principle of the present invention.
Figure 5:
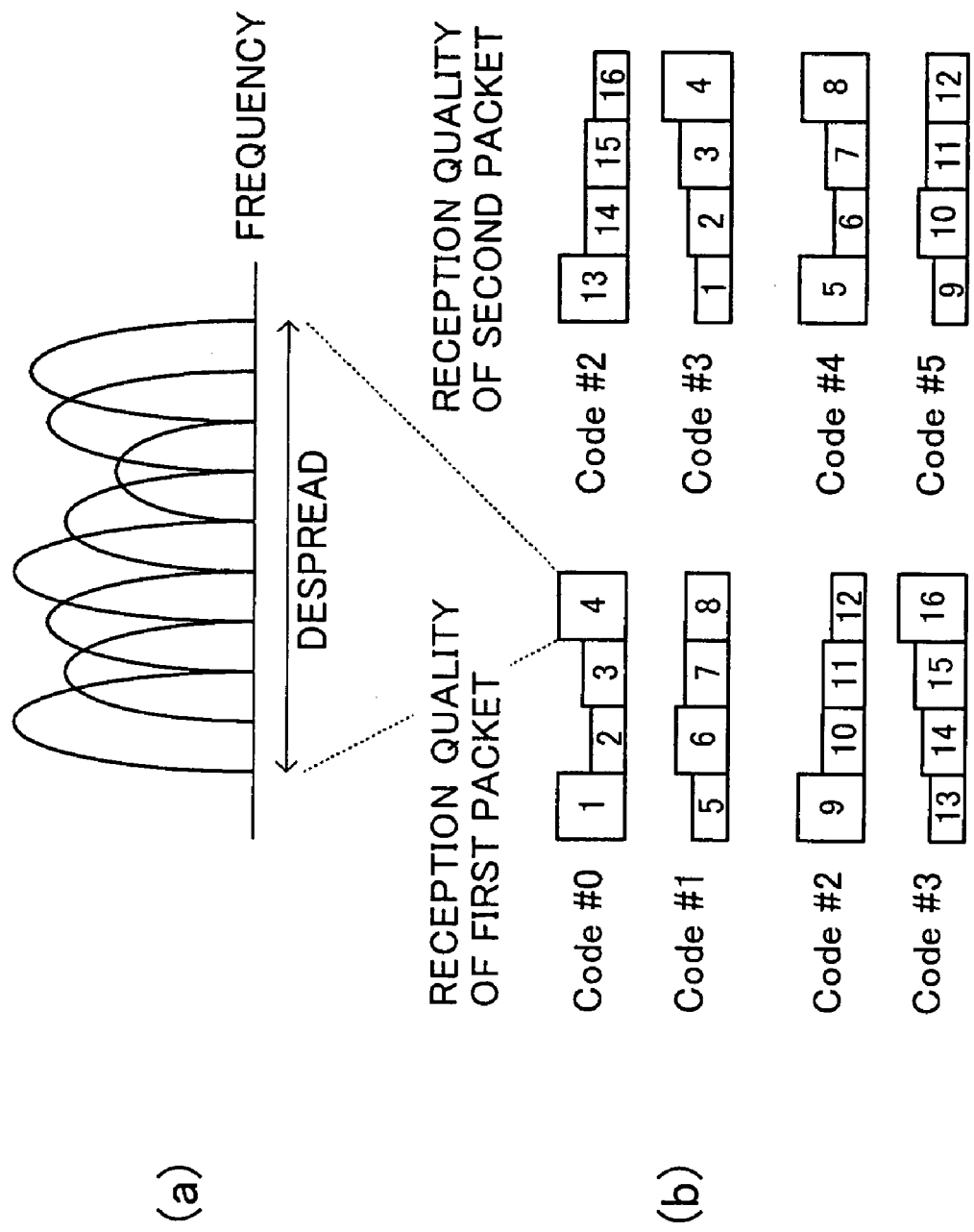
FIG. 5 is a view explaining reception quality (reception level) of each symbol at the time of receiving the OFDM-CDMA signal of FIG. 4.
Figure 6:
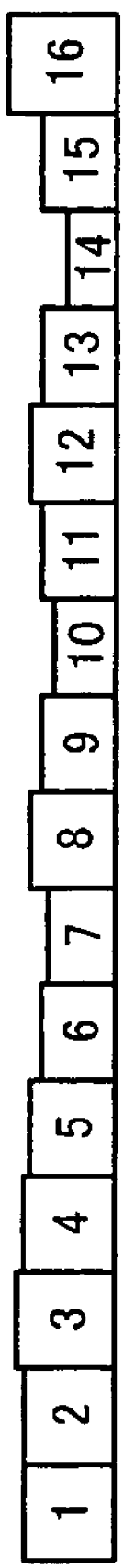
FIG. 6 is a view illustrating reception quality (reception level) of each symbol when the same symbols of the first and second packets of FIG. 5 are combined.

(1-2) Case in which the number of spread codes, which is larger than that of signal multiplexes, is used The following will explain the case in which in which the number of spread codes, which is larger than that of signal multiplexes, is used using FIGS. 4 to 6. The item (1-1) has explained the case in which the same spread codes #0 to #3 are used at the first transmission time and the retransmission time and the spread codes allocated to the transmission symbols are changed for each transmission.

While, as illustrated in FIG. 4(b), in this item, the spread codes to be used made different at the transmission time of the first packet (first transmission time) and the transmission time of the second packet (retransmission time). As a result, since diversity effect can be more obtained, the reception quality can be more improved. Specifically, as illustrated in FIG. 4(b), transmission data is spread using spread codes #0 to #3 at the transmission time of the first packet, and transmission data is spread using spread codes #2 to #5 at the transmission time of the second packet.

FIG. 5 is a view illustrating the reception quality (signal level) of each symbol at the time of demodulating transmission data transmitted after being subjected to spread processing and OFDM processing shown in FIG. 4. Since allocation of spread codes #0 to #5 to the respective symbols "1" to "16" is changed for each transmission, there is an extremely low probability that the reception quality of the same symbol will be continuously reduced at the plurality of transmission times. As a result, since the quality of the respective symbols obtained by the reception of the same data two times after combining becomes uniform (equalized) to eliminate symbols having extremely poor quality as illustrated in FIG. 6, the reception quality can be improved as a whole. This leads to a reduction in the number of retransmission times.

Additionally, regarding FIGS. 4 and 5, the explanation has been given of the case in which six kinds of the spread codes #0 to #5 are allocated to the transmission symbols of four sequences to perform spread processing, however, for example, eight kinds of the spread codes #0 to #7 may be prepared to perform spread processing using any four of the spread codes for each transmission. In this way, since diversity effect can be more obtained, the reception quality can be more improved.

(1-3) Comparison

The following will explain comparison between a case that the same transmission symbol is transmitted at the retransmission time using the spread codes different from those used at the previous transmission time and a case that the transmission symbol is retransmitted by general OFDM-CDMA system.

Figure 7:
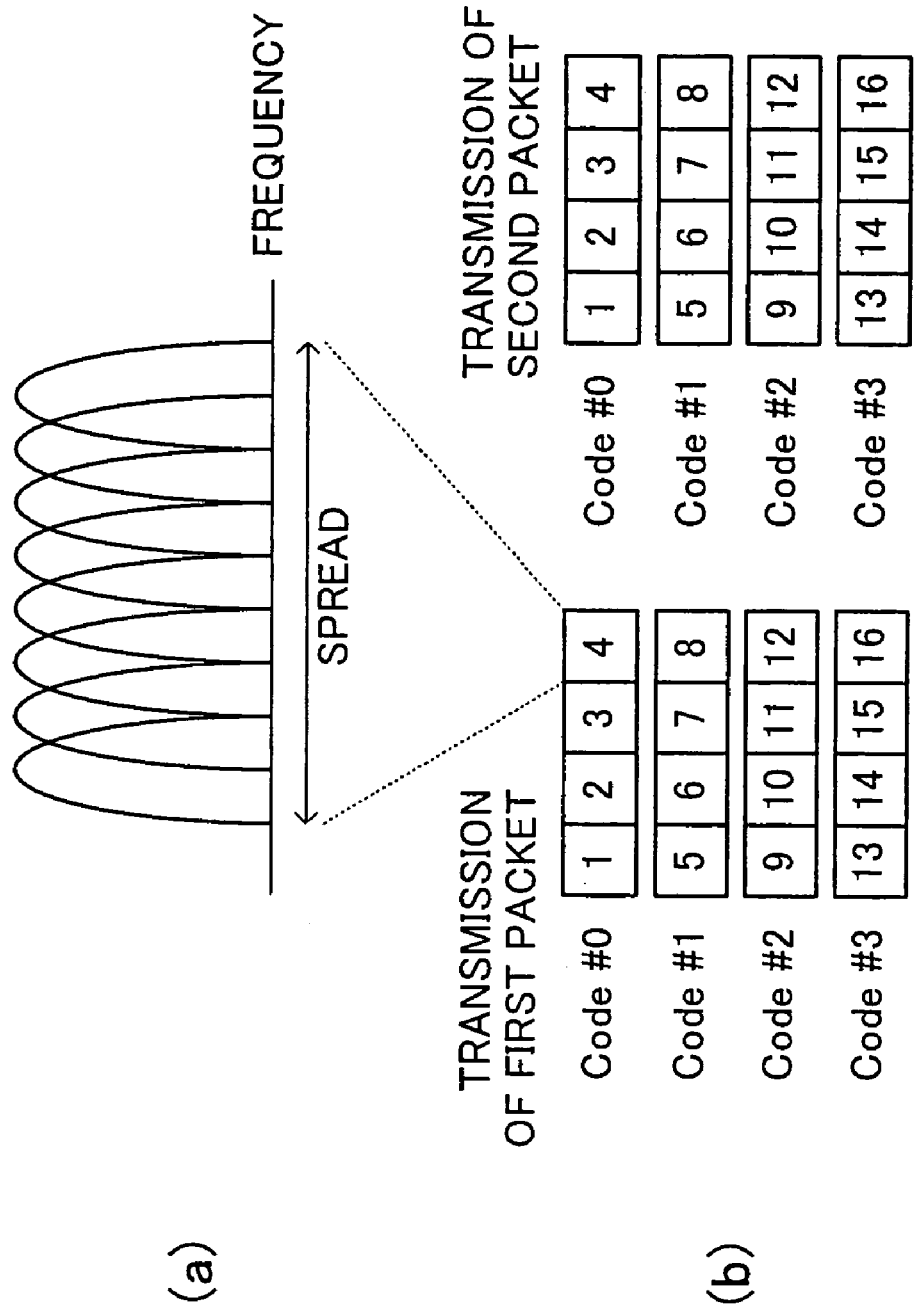
FIG. 7 is a view illustrating an example of a spread code allocation to each symbol at the time of transmitting an OFDM-CDMA signal generally as a comparison of the present embodiment.

In the general OFDM-CDMA system, as illustrated in FIG. 7(b), the respective symbols are spread using the same spread codes #0 to #3 at the transmission time of the first packet (first transmission) and the transmission time of the second packet (retransmission time). For example, when the transmission symbols "1" to "4" are spread using the spread code #0 at the first transmission time, the transmission symbols "1" to "4" are also spread using the spread code #0 at the retransmission time. Similarly, regarding the transmission symbols "5" to "8", they are spread using the spread code #1 at the first transmission time and retransmission time.

Figure 8:
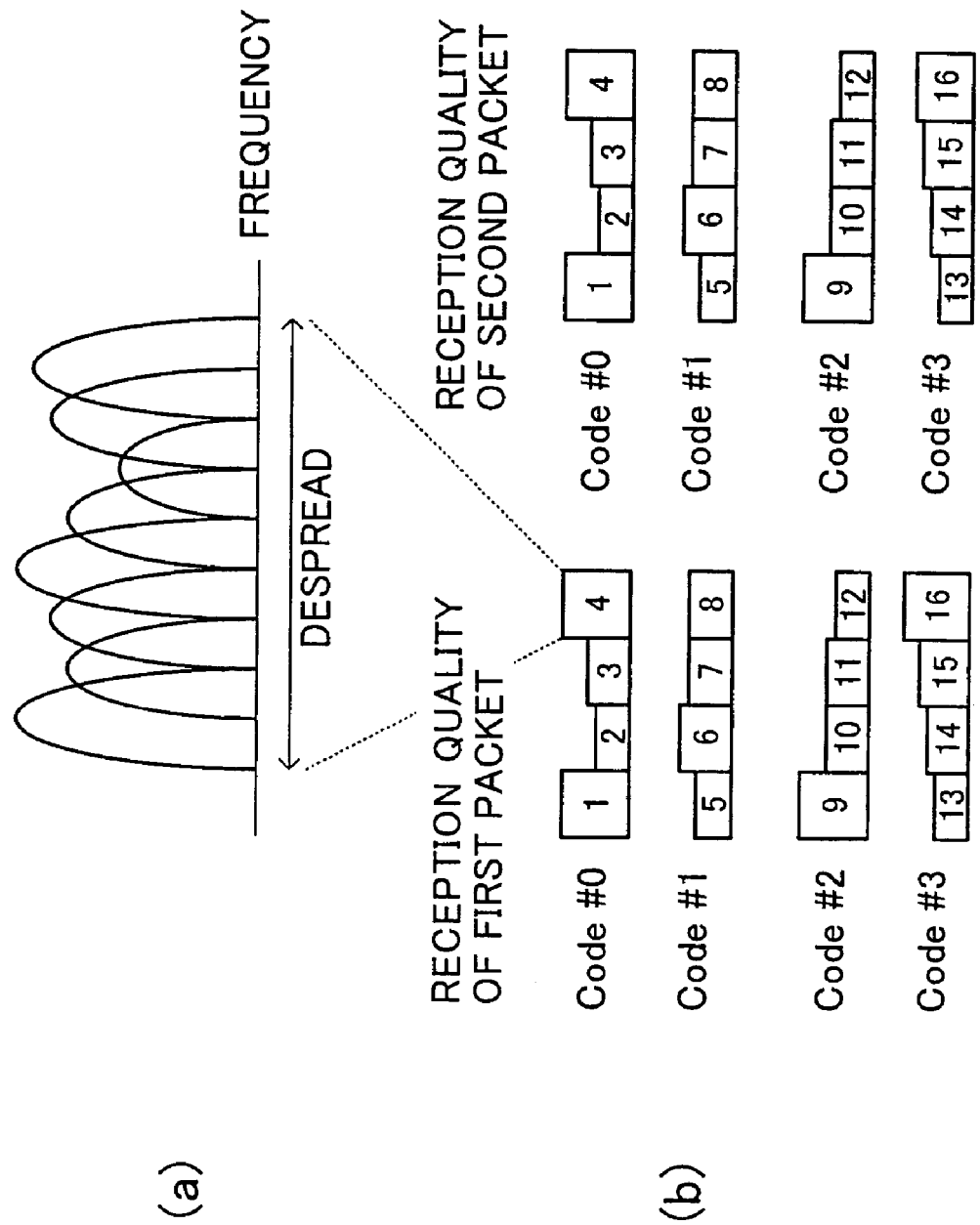
FIG. 8 is a view explaining reception quality (reception level) of each symbol at the time of receiving the OFDM-CDMA signal of FIG. 7.

Here, as illustrated in FIG. 8(a), when the OFDM signal where the spread chip is superimposed on each subcarrier is subjected to frequency selective fading and the level of a specific subcarrier drops and attention is paid to symbols "1", "5", "9", and "13" superimposed on the same subcarrier as illustrated in FIG. 8(b), a desirable reception level (reception quality) can be obtained in connection with symbols "1" and "9" spread using the spread codes such as spread codes #0 and #2 whose breakage of orthogonality is small, but a desirable reception level (reception quality) cannot be obtained in connection with symbols "5" and "13" spread using the spread codes such as spread codes #1 and #3 whose breakage of orthogonality is large.

When the time variation of propagation environments is small, the same spread codes whose breakage of orthogonality is large become the same at the first transmission time and the retransmission time. In the example in FIG. 8(b), spread codes #1 and #3 are spread codes whose breakage of orthogonality is large at both the first transmission time and the retransmission time.

Figure 9:
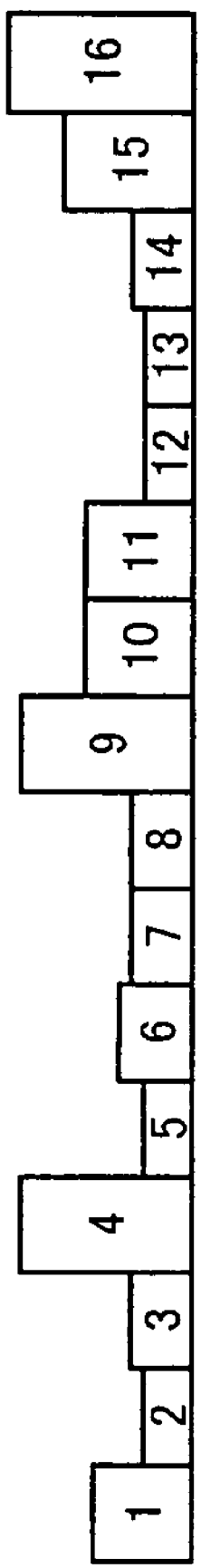
FIG. 9 is a view illustrating reception quality (reception level) of each symbol when the same symbols of the first and second packets of FIG. 8 are combined.

As a result, when the same spread code is used in connection with the same symbol, reception power of the respective symbols after combining on the receiving side is no more than twice value as large as the value obtained at one reception time as illustrated in FIG. 9, so that a sufficient reception quality cannot be obtained in connection with the symbols spread using spread codes whose breakage of orthogonality is large.

Figure 10:
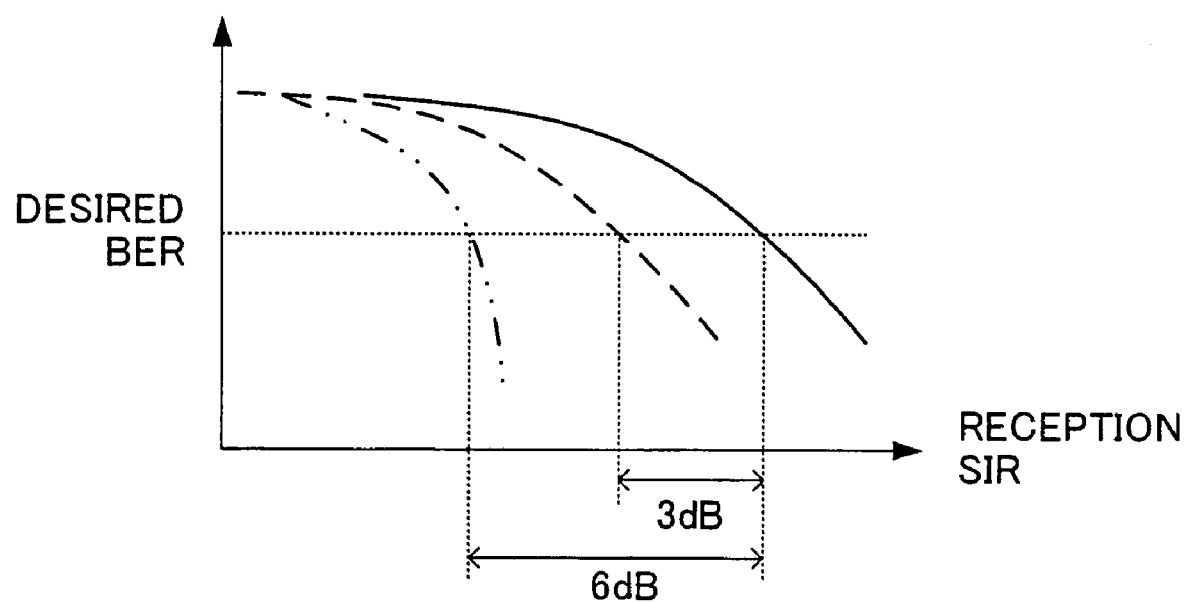
FIG. 10 is a characteristic curve sheet showing comparison between reception quality obtained when the configuration of the present invention is applied and reception quality obtained by the conventional configuration.

Actually, as illustrated in FIG. 10, the communication method of the present invention can remarkably improve the reception performance as compared with the conventional method. FIG. 10 is a characteristic curve sheet showing the relationship between a bit error rate (BER) and a reception SIR. Here, in the figure, a solid line indicates a characteristic curve when one transmission and reception are performed, a one-dot chain line indicates a characteristic curve when transmission and reception are performed by the general OFDM-CDMA system as explained in FIGS. 7 to 9 to combine two packets, and a two-dot chain line indicates a characteristic curve when transmission and reception are performed by the OFDM-CDMA system of this embodiment to combine two packets.

As is obvious from FIG. 10, by diversity effect that is obtained by changing the spread codes to the same symbol at the first transmission time and the retransmission time to perform transmission, a desirable BER can be obtained with a small reception SIR as compared with the general OFDM-CDMA system, and the reception performance can be improved. Actually, the graph shows the sharp increase of the reception performance as compared with the conventional method, and even when two packets are combined, a gain larger than 3 dB of the conventional system can be obtained.

(2) Configuration

An explanation will be next given of the specific configuration of the radio transmitting apparatus and that of the radio receiving apparatus according to this embodiment. This embodiment will explain the configuration of the radio transmitting apparatus and that of the radio receiving apparatus when transmission data is transmitted to one counterpart station, and that of the radio transmitting apparatus when transmission data is transmitted to a plurality of counterpart stations.

(2-1) Case in which transmission data is transmitted to one counterpart station

Figure 11:
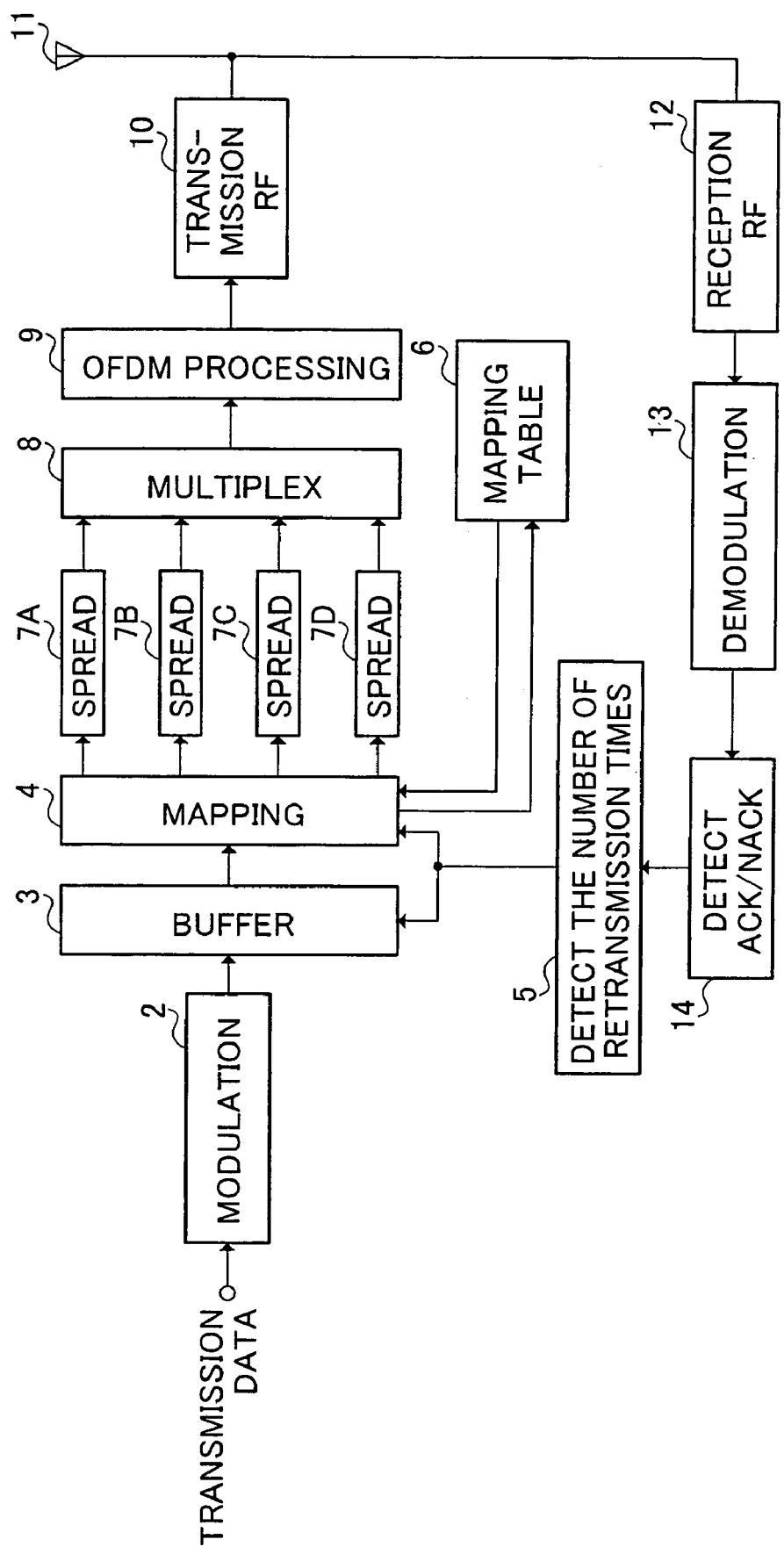
FIG. 11 is a block diagram illustrating the configuration of a radio transmitting apparatus according to the present embodiment.

In FIG. 11, 1 denotes the configuration of the radio transmitting apparatus for implementing the aforementioned radio communication method of the present invention and this is provided to, for example, a radio base station or a communication terminal station.

The radio communication apparatus 1 inputs transmission data to a modulating section 2 and modulation processing such as QPSK (Quadrature Phase Shift Keying), 16 QAM (Quadrature Amplitude Modulation) and the like is performed by the modulating section 2. The modulated data are stored in a buffer section 3. A retransmission time detecting section 5 notifies the buffer section 3 of information of the number of retransmission times of the packet, and outputs data from the buffer 3 when retransmission is necessary, and clears the buffer 3 when data is correctly transmitted to the receiving side.

A mapping section 4 determines a combination of spread codes to be used for transmission according the number of retransmission times with reference to a mapping table 6, and performs data mapping. An example of the table is shown in FIG. 12. In the example of FIG. 12, at the first transmission, in transmitting 16-bit data, four spread codes (code #0, code #1, code #2, code #3) are used and four bits are transmitted using each spread code.

Here, the mapping section 4 divides input 16-bit data into four and outputs data to spreading sections 7A to 7D such that data can be spread four bits by four bits using codes #0 to #3, respectively. In addition, when the mapping section 4 is configured by the table as illustrated in FIG. 12, the number of spread codes, which is the same as that of signal multiplexes, is used and the spread code to be used to the same symbol can be changed for each transmission as explained in the aforementioned item (1-1).

While, when the mapping section 4 is configured by the table as illustrated in FIG. 13, the number of spread codes, which is larger than that of signal multiplexes, is used and the spread code to be used to the same symbol can be changed for each transmission as explained in the aforementioned item (1-2).

Spreading sections 7A to 7D perform spreading of data using the spread codes designated by the mapping section 4, respectively. A multiplexing section 8 multicode multiplexes spread data. The code multiplexed signal is subjected to OFDM processing such as IFFT (Inverse Fast Fourier Transformation) by an OFDM processing section 9, and the spread signal is placed to a plurality of subcarriers in a frequency axial direction (namely, frequency spread is performed). A predetermined radio transmission processing such as power amplification and the like is provided to the signal subjected to OFDM processing by a radio transmitting section (transmission RF) 10, thereafter the resultant is transmitted to the counterpart station from an antenna 11.

Moreover, the radio transmitting apparatus 1 has a receiving system that receives an ACK (ACKnowledgement: affirmative acknowledgement) signal and an NACK (Negative ACKnowledgement: negative acknowledgement) signal and demodulates them. The receiving system of the radio transmitting apparatus 1 demodulates the received ACK/NACK signals via a receiving RF section 12 and a demodulating section 13, and transmits the resultant to an ACK detecting section 14.

When detecting the ACK signal, the ACK detecting section 14 notifies the retransmission time detecting section 5 that the ACK signal has been received. When receiving this notification, the retransmission time detecting section 5 clears the buffer section 5.

In contrast to this, when detecting the NACK signal, the retransmission time detecting section 5 calculates the number of transmission times of the packet, and changes the spread code to be used for transmission according to the number of transmission times. As illustrated in FIG. 12, it is assumed that the spread codes to be used are #1, #2, #3, and #0 at the transmission of the second packet (retransmission time). The tables of FIGS. 12 and 13 show only the transmission codes up to the second times, however, at the third transmission and afterward, transmission is performed as changing the spread cod in the same manner.

Figure 14:
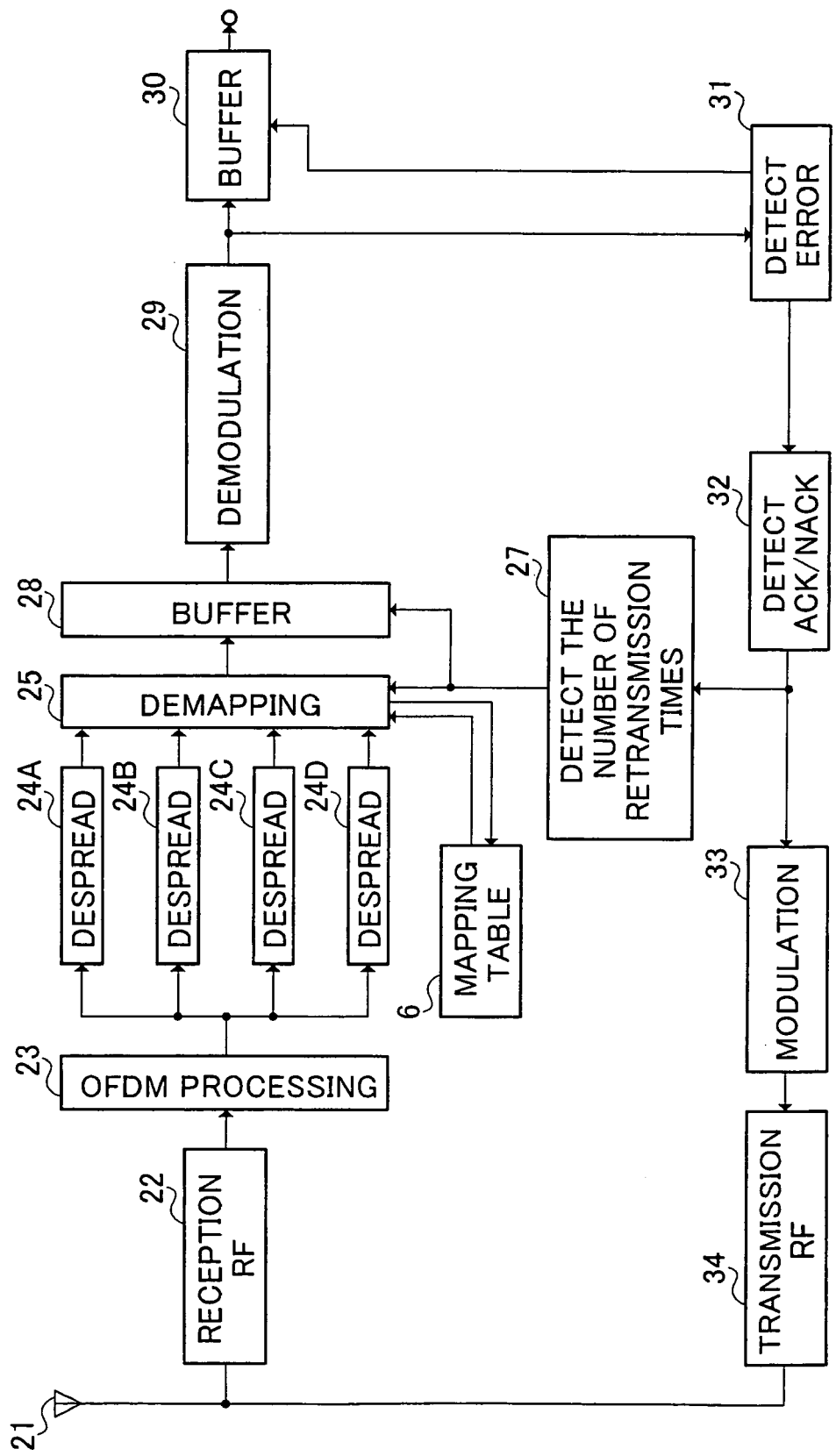
FIG. 14 is a block diagram illustrating the configuration of a radio receiving apparatus according to the present embodiment.

An explanation will be next given of the configuration of a radio receiving apparatus 20 that receives the signal transmitted from the radio transmitting apparatus 1 and demodulates it using FIG. 14. In the radio receiving apparatus 20, a reception radio section (reception RF) 22 provides predetermined radio reception processing to the signal received by an antenna 21, and an OFDM processing section 23 subsequent thereto provides OFDM processing such as FFT (Fast Fourier Transformation). Thereafter, despreading sections 24A to 24D perform despread processing. Here, the despreading sections 24A to 24D despread the signals subjected to OFDM processing by use of different spread codes #0, #1, #2, and #3, respectively A demapping section 25 collects the signals despread by the spread codes used at the transmission time from the despread signals, and performs demapping. At this time, the demapping section 25 recognizes which spread code is used according to the number of retransmission times with reference to a mapping table 26, and performs data demapping.

The signals subjected to demapping are stored in a buffer section 28. As a result, when the same transmission data is received a plurality of times, the synthesized signals corresponding to the plurality of times regarding the respective transmission symbols are stored to the buffer section 28 for each symbol.

The signal demodulated by a demodulating section 29 is sent to a buffer section 30 and an error detecting section 31. The error detecting section 31 performs error detection processing to the demodulated signal. When detecting no error, the error detecting section 31 instructs the buffer 30 to output received data, and instructs an ACK/NACK generating section 32 to generate an ACK signal. On the other hand, when detecting an error, the error detecting section 31 instructs the buffer 30 not to output received data, and instructs the ACK/NACK generating section 32 to generate an NACK signal. The ACK signal and NACK signal generated by the ACK/NACK generating section 32 are transmitted to the radio transmitting section 1 via a transmission RF section 34 and the antenna 21.

A retransmission time detecting section 27 counts the number of ACK signals and NACK signals transmitted up to the present time and thereby detects the number of retransmission times. For example, when the NACK signal is never transmitted, it is shown that the received data is the first packet, and when the first NACK signal is transmitted, it is shown that the received data is the second packet, namely, retransmission data about the same data. In this way, the radio receiving apparatus 20 can demodulate transmitted data satisfactorily as changing the spread codes by the radio transmitting apparatus 1.

Figure 15:
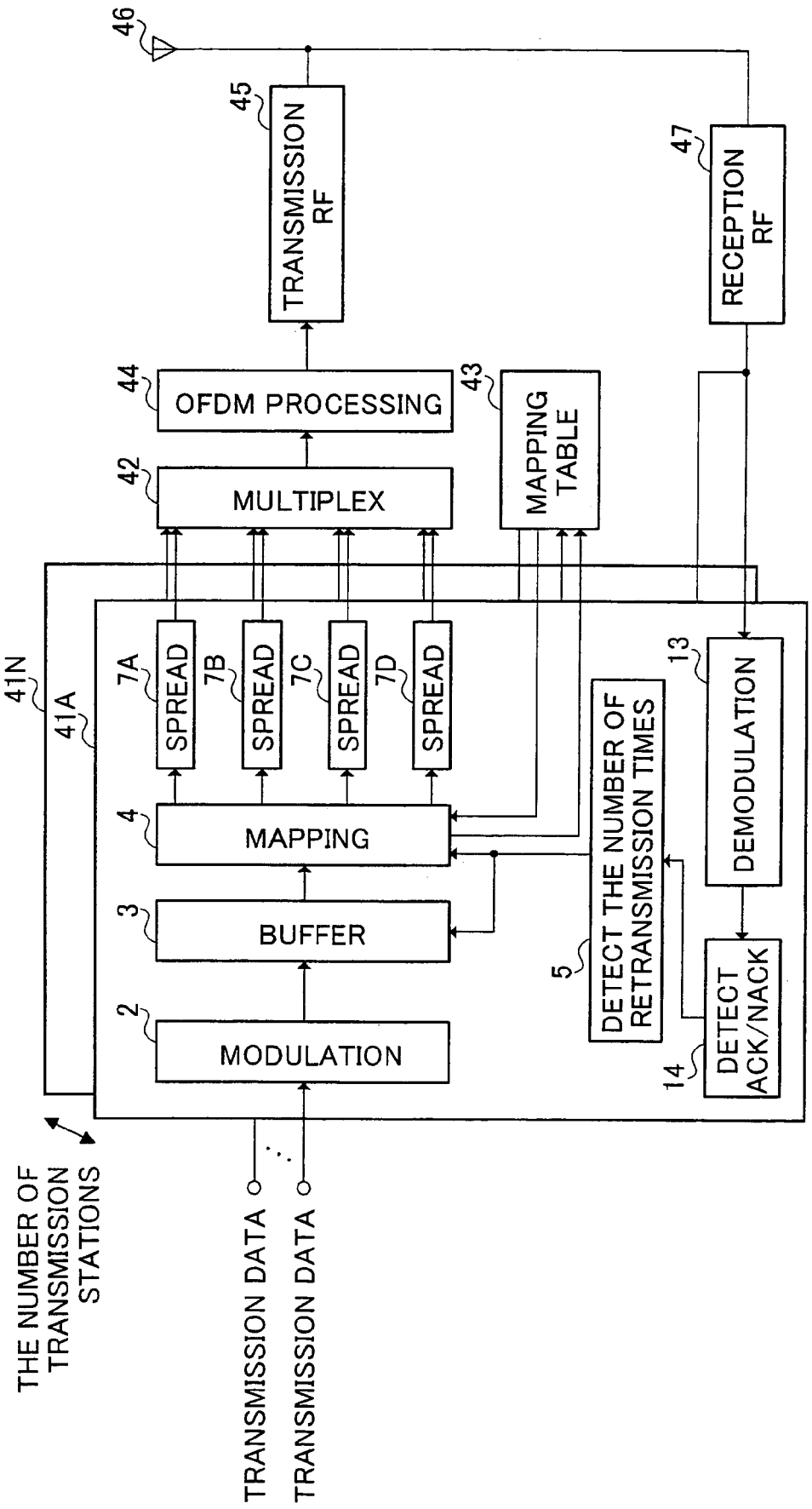
FIG. 15 is a block diagram illustrating the configuration of a radio transmitting apparatus according to the present embodiment.

(2-2) Case in which transmission data is transmitted to a plurality of counterpart stations In FIG. 15 where the same reference numerals are added to the portions corresponding to those of FIG. 11, a radio transmitting apparatus 40 transmits different transmission data to each of the plurality of counterpart stations. For this reason, the radio transmitting apparatus 40 has signal processing units 41A . . . , 41N corresponding to the number of counterpart stations.

The signal processing units 41A . . . , 41N are formed by the same configuration, respectively, and each detects the number of retransmission times to each transmission counterpart station as explained in the item (2-1), and changes the spread code to be spread for each retransmission to perform spreading to the same transmission data.

Here, since the radio transmitting apparatus 40 transmits different transmission data to the plurality of counterpart stations, the spreading sections of signal processing units 41A . . . , 41N use different spread codes, respectively. Namely, the spreading sections 7A to 7D of the signal processing unit 41A and the spreading sections (not shown) of the signal processing unit 41N use different spread codes, respectively.

The selection of spread code is carried out by referring to a mapping table 43. More specifically, combinations of spread codes for each of the number of transmission times as illustrated in FIGS. 12 and 13 may be stored by the number of signal processing units.

The spread signals obtained by being spread by the respective signal processing units 41A . . . , 41N are multiplexed by a multiplexing section 42, and they are subjected to OFDM processing such as IFFT and the like by an OFDM processing section 44, and transmitted via a transmission RF section 45 and an antenna 46 sequentially. Moreover, the radio transmitting apparatus 40 transmits the ACK signal and NACK signal received by the antenna 46 to the respective signal processing units 41A . . . , 41N via a reception RF section 47. Each of the demodulating sections 13 provided in each of the respective signal processing units 41A 41N demodulates the ACK signal and NACK signal sent from the corresponding counterpart station, and transmits them to the ACK/NACK detecting section 14. The afterward processing is the same as explained in FIG. 11.

(3) Effect

According to the configuration illustrated in FIGS. 11 to 15, the spread code is changed for each transmission in spreading the same transmission symbol, so that even when the reception quality of the symbol spread by a specific spread code is poor due to frequency selective fading at the first transmission time, spread processing is performed by the spread code different from one used at the first transmission when retransmission is performed, making it possible to increase probability that the reception quality will be improved by diversity effect. As a result, the reception quality of the combined symbols can be improved.

(4) Other Embodiments

The aforementioned embodiment has explained the case in which the present invention is applied to the OFDM-CDMA radio communication. However, the present invention is not limited to this and the similar effect can be obtained even in a case in which it is applied to the general CDMA system where the spread chip is superimposed on a single carrier.

More specifically, even when the spread chip is transmitted using the single carrier as in a W-CDMA system, orthogonality between the respective spread codes will be broken by the intercode interference of the spread code. The breakage of orthogonality differs depending on the spread code similar to the aforementioned OFDM-CDMA system. Accordingly, power of the despread signal differs for each spread code. For this reason, the present invention can obtain the similar effect even when it is applied to the normal CDMA system without limiting to the radio communication of the OFDM-CDMA system. However, when the present invention is applied to OFDM-CDMA, since power of the despread signal in OFDM-CDMA system varies depending on the spread code to be used as compared with CDMA of the single carrier, more remarkable effect can be obtained.

Moreover, the aforementioned embodiment has explained the case in which the method of allocating the spread code to mainly one counterpart station is changed for each transmission. However, the spread codes allocated to the plurality of counterpart stations may be changed for each transmission to perform transmission.

For example, if signal processing units 4A to 4N illustrated in FIG. 15 are formed of three signal processing units 4A, 4B, and 4C, respectively and the spreading sections of signal processing units 4A, 4B, 4C use spread codes #0 to #3, #4 to #7, and #8 to #11 at the first transmission time, respectively, the signal processing units 4A, 4B, 4C use spread codes #8 to #11, #0 to #3, and #4 to #7 at the retransmission time, respectively. Since this increases the number of usable spread codes as compared with the aforementioned embodiment, deterioration in the reception quality caused by a specific spread code can be more dispersed for each retransmission, making it possible to more reduce probability that a specific reception symbol will deteriorate.

The aforementioned embodiment has explained the case in which the radio receiving apparatus 20, which receives the signal from the radio transmitting apparatus 1, transmits the ACK signal or NACK signal to the radio transmitting apparatus 1 according to the error rate of the received signal. In addition to this, the radio receiving apparatus 20 may transmit a signal, which instructs a change in the spread code, with the NACK signal to the radio transmitting apparatus 1.

This makes it possible to more improve the reception quality. In other words, the radio receiving apparatus 20 recognizes which symbol is spread at this transmission with reference to a mapping table and which spread code is used in this case, and the reception quality of the symbol can be detected by a detecting section 31. Accordingly, the radio receiving apparatus 20 can grasp which spread code should be used under the present propagation environment to improve the reception quality.

Accordingly, when there is a symbol with no sufficient reception quality up to the previous time, the radio receiving apparatus 20 may transmit a signal, which gives an instruction to perform spreading using the spread code where good result of reception quality obtained previous time, together with the NACK signal.

The aforementioned embodiment has explained the method in which all symbols transmitted at the first time are transmitted and combined at the retransmission time. However, there may be used the configuration in which the symbols transmitted using some spread codes are transmitted using other spread codes without transmitting all symbols transmitted at the first time when retransmission is performed. This configuration makes it possible to retransmit only the symbol of the spread code including an error by adding error detection (CRC and the like) for each spread code.

As a result, since the symbols can be transmitted using the spread codes whose breakage of orthogonality is small at the time of retransmitting the error symbols, the number of retransmission times can be reduced. Moreover, since another symbol can be transmitted using the spread code where no error is generated at the first transmission, system throughput can be improved.

The present invention is not limited to the aforementioned embodiment and various modifications can be carried out.

The radio transmitting apparatus of the present invention adopts a configuration including spreading section for spreading transmission data using a spread code and transmitting section for transmitting the spread data, wherein the spreading section spreads transmission data using the spread code different from one used at the previous transmitting time when retransmission is performed.

According to this configuration, transmission data is spread using the spread code different from one used at the previous transmitting time when retransmission is performed with consideration given to the spread code where reception quality is largely degraded by intercede interference at signal propagating time and the spread code where reception quality is not degraded so much by interference. As a result, the receiving side can enhance diversity effect by retransmission to make it possible to improve the quality of received data.

The radio transmitting apparatus of the present invention adopts a configuration wherein when transmission data is divided into data of a plurality of sequences and transmission data of each sequence is spread using a plurality of spread codes having orthogonality therebetween to transmit transmission data to one counterpart station, the spreading section spreads transmission data of each sequence using the same number of spread codes as the sequences of the plurality of sequences and changes a combination of spread codes to be used to spread transmission data of each sequence from a combination used at the previous transmission time when transmission data is retransmitted.

According to this configuration, it is possible to obtain diversity effect as maintaining the number of spread codes to be used for transmission constant. For example, when transmission data is divided into data of four sequences, four spread codes #0 to #3 are used, transmission data of the first sequence, that of second sequence, that of third sequence and that of fourth sequence are spread by the spread codes #0, #1, #2, and #3, respectively at the first transmission time, and transmission data of the first sequence, that of second sequence, that of third sequence and that of fourth sequence are spread by the spread codes #1, #2, #3, and #0, respectively at the retransmission time, and transmission data of four sequences is thereby multicode multiplexed.

The radio transmitting apparatus of the present invention adopts a configuration wherein when transmission data is divided into data of a plurality of sequences and transmission data of each sequence is spread using a plurality of spread codes having orthogonality therebetween to transmit transmission data to one counterpart station, the spreading section selects a spread code from among the spread codes, which are larger than the number of sequences of the plurality of sequences to spread transmission data of each sequence, and selects a spread code different from one used at the previous transmission time to spread transmission data of each sequence when transmission data is retransmitted.

According to this configuration, since the spread code, which is different at the previous transmission time and retransmission time, from numerous spread codes to perform spreading, much larger diversity can be obtained. For example, when transmission data is divided into data of four sequences, six spread codes #0 to #5 are used, transmission data of the first sequence, that of second sequence, that of third sequence and that of fourth sequence are spread by the spread codes #0, #1, #2, #3, respectively at the first transmission time, and transmission data of the first sequence, that of second sequence, that of third sequence and that of fourth sequence are spread by the spread codes #3, #4, #5, and #2, respectively at the retransmission time, and transmission data of four sequences is thereby multicode multiplexed.

The radio transmitting apparatus of the present invention adopts a configuration wherein when a plurality of transmission data is spread using a different spread code according to transmission counterpart stations to transmit spread transmission data to the plurality of different counterpart stations, spreading section spreads transmission data as using the spread code, which was used in spreading transmission data to the first counterpart station at the previous transmitting time, for use in spreading transmission data to the second counterpart station at the retransmission time.

According to this configuration, since it is possible to increase the number of combinations of spread codes to be used in connection with the plurality of transmission counterpart stations to which transmission is simultaneously performed, large diversity effect can be obtained at the receiving time. Namely, the number of usable spread codes is increased, so that deterioration in the reception quality caused by the specific spread code can be more dispersed at the retransmission time, thereby more reducing probability that the specific received symbol will deteriorate.

The radio transmitting apparatus of the present invention adopts a configuration further comprising orthogonal frequency division multiplexing section for dividing the spread signal into a plurality of subcarriers having an orthogonal relationship therebetween wherein the transmitting section transmits the signal subjected to orthogonal frequency division multiplexing.

According to this configuration, since transmission data is spread using the spread code, which is different from one used at the previous transmission time, when transmission data is retransmitted in the OFDM-CDMA system, the reception quality is more improved by diversity effect. In other words, in the OFDM-CDMA system, since power of the despread signal varies depending on the spread code to be used as compared with CDMA of the single carrier, the diversity effect, which is caused by changing the spread code at the retransmission time, is more remarkably provided.

The radio receiving apparatus of the present invention is the radio receiving apparatus that receives the signal transmitted from the aforementioned radio transmitting apparatus and adopts a configuration having despreading section for despreading the retransmitted received signal using a spread code different from one used at the previous receiving time.

According to this confirmation, it is possible to satisfactorily demodulate the signal transmitted from the aforementioned radio transmitting apparatus.

The radio receiving apparatus of the present invention adopts a configuration further comprising section for combining despread signals of the plurality of received signals received by retransmission.

According to this configuration, regarding even the received data where sufficient quality was not obtained since the spread code used at the first receiving time was easily degraded by interference, there is a possibility that received data having reception quality better than the reception quality of the first time will be obtained since the different spread code is used at the retransmission time, and the quality of received data can be improved with fairly high probability by combining these.

The radio receiving apparatus of the present invention adopts a configuration further comprising change instruction signal transmitting section for transmitting a signal instructing the radio transmitting apparatus to change the spread code according to the signal level of the despread signal.

According to this configuration, in a case where there is transmission data where sufficient quality cannot be obtained up to the previous time, an instruction to change the spread code for spreading this transmission data is sent to the transmission side by change instruction signal transmitting section, making it possible to improve the reception quality of the transmission data at the next retransmission time.

The radio receiving apparatus of the present invention is the radio receiving apparatus that receives the signal transmitted from the aforementioned radio transmitting apparatus, and adopts a configuration comprising orthogonal transforming section for providing orthogonal transform processing to the received signal and despreading section for despreading the signal subjected to orthogonal transform using a different code for each retransmission.

According to this configuration, it is possible to satisfactorily demodulate the signal transmitted from the aforementioned radio transmitting apparatus.

The radio transmitting apparatus of the present invention adopts a configuration further comprising receiving section for receiving a change instruction signal that instructs the change in the spread code from the counterpart station wherein the spreading section spreads transmission data using the spread code changed according to the change instruction signal.

According to this configuration, it is possible to satisfactorily change the spread code to be used at the retransmission time according to the change instruction of the spread code from the counterpart station and to demodulate the transmission signal.

The radio transmitting method of the present invention spreads transmission data using the spread code different from one used at the previous transmitting time when transmission data is retransmitted.

According to this method, it is possible to improve the error rate due to retransmission on the receiving side by the diversity effect. As a result, the number of retransmission times can be reduced.

In the radio transmitting method of the present invention, when transmission data is divided into data of a plurality of sequences and transmission data of each sequence is spread using a different spread code to transmit, a combination of spread codes to be used to spread transmission data of each sequence is changed from a combination used at the previous transmitting time when retransmission is performed.

According to this method, it is possible to obtain diversity effect as maintaining the number of spread codes to be used for transmission constant.

As explained above, according to the present invention, in the radio communication system using the CDMA system, the spread code that spreads each symbol is changed every time when retransmission is performed, thereby making it possible to improve the error rate on the receiving side.

This application is based on the Japanese Patent Application No. 2002-009230 filed on Jan. 17, 2002, entire content of which is expressly incorporated by reference herein.

INDUSTRIAL APPLICABILITY

The present invention is applied to a radio transmitting apparatus, which is suitably applicable to CDMA system that adaptively performs retransmission according to a bit error rate of a received signal, radio receiving apparatus and radio transmitting method.

The invention claimed is:

1. A radio transmitting apparatus comprising:
a spreading section that spreads transmission data using a spread code; and
a transmitting section that transmits a spread signal,
wherein, when the transmission data is divided into data of a plurality of sequences and the transmission data of the sequences is spread using a plurality of orthogonal spread codes to transmit to one counterpart station, the spreading section spreads the transmission data of the sequences using the same number of spread codes as the sequences of the plurality of sequences and changes combinations of the sequences and the spread codes to be used to spread the transmission data from combinations used upon the previous transmission, when the transmission data is retransmitted.

2. The radio transmitting apparatus according to claim 1, wherein the spreading section spreads the transmission data using the same spread codes upon retransmission and the previous transmission and changes allocation of the spread codes to the transmission data of the plurality of sequences between the retransmission and the previous transmission.

3. A radio transmitting apparatus comprising:
a spreading section that spreads transmission data using a spread code; and
a transmitting section that transmits a spread signal,
wherein, when the transmission data is divided into data of a plurality of sequences and the transmission data of the sequences is spread using a plurality of orthogonal spread codes to transmit to one counterpart station, the spreading section selects a spread code from the spread codes of a larger number than the number of sequences of the plurality of sequences to spread the transmission data, and selects a spread code different from one used upon the previous transmission to spread the transmission data when the transmission data is retransmitted.

4. A radio transmitting apparatus comprising:
a spreading section that spreads transmission data using a spread code; and
a transmitting section that transmits a spread signal,
wherein, when the plurality of transmission data is spread using different spread codes according to transmission counterpart stations and the spread transmission data is transmitted to the plurality of different counterpart stations, the spreading section spreads the transmission data so that the spread codes used to spread the transmission data for a first counterpart station upon the previous transmission are used to spread the transmission data for a second counterpart station upon retransmission.

5. A radio transmitting method comprising:
a spreading step of spreading transmission data using a spread code; and
a transmitting step of transmitting a spread signal,
wherein, when the transmission data is divided into data of a plurality of sequences and the transmission data of the sequences is spread using a plurality of orthogonal spread codes to transmit to one counterpart station, the spreading step spreads the transmission data of the sequences using the same number of spread codes as the sequences of the plurality of sequences and changes combinations of the sequences and the spread codes to be used to spread the transmission data from combinations used upon the previous transmission when the transmission data is retransmitted.

* * * * *